May 17, 1927. H. C. HANSON HEATING STOVE USING LIQUID VAPORIZING FUEL Re. 16,625

Original Filed April 13, 1925 2 Sheets-Sheet 1

INVENTOR
HANS C. HANSON
BY HIS ATTORNEYS
Williamson Reif & Williamson

H. C. HANSON

May 17, 1927. HEATING STOVE USING LIQUID VAPORIZING FUEL Re. 16,625

Original Filed April 13, 1925 2 Sheets-Sheet 2

INVENTOR
HANS C. HANSON
BY HIS ATTORNEYS
Williamson Reif & Williamson

Reissued May 17, 1927. Re. 16,625

UNITED STATES PATENT OFFICE.

HANS C. HANSON, OF ALBERT LEA, MINNESOTA, ASSIGNOR TO AMERICAN GAS MACHINE COMPANY, OF ALBERT LEA, MINNESOTA, A CORPORATION OF MINNESOTA.

HEATING STOVE USING LIQUID VAPORIZING FUEL.

Original No. 1,615,378, dated January 25, 1927, Serial No. 22,586, filed April 13, 1925. Application for reissue filed April 9, 1927. Serial No. 182,522.

This invention relates to a stove adapted to use liquid hydrocarbon fluid and particularly to a heating stove. It is often very desirable to have a comparatively small portable heating stove in a dwelling when the weather is not sufficiently cold to maintain a fire in the furnace and it is also desirable to have such a stove to heat some rooms which may be insufficiently equipped with furnace or other heating means.

It is an object of this invention to provide a simple, safe and efficient portable heating stove adapted to use liquid vaporizing fuel, which stove is also neat and pleasing in appearance.

It is a further object of the invention to provide a comparatively small portable heating stove comprising a casing, which stove has a detachable and removable liquid fuel tank and vaporizing tube which can be quickly and easily removed from said casing and quickly and easily re-inserted in place.

It is another object of the invention to provide a heating stove having such a liquid fuel tank, which tank is disposed in the casing of the stove below the burners of the stove, draft passages being so arranged that cold air passes over the tank and keeps the same in a cool condition.

It is also an object of the invention to provide such a heating stove using liquid vaporizing fuel which comprises a burner casting or manifold constituting a mixing chamber, a vaporizing tube communicating with the mixing chamber, together with an auxiliary burner adjacent said vaporizing tube for vaporizing the fuel.

It is still a further object of the invention to provide a stove, as set forth in the preceding paragraph, in which said manifold and mixing chamber has an air inlet which is provided with a movable member adapted to open and close said inlet.

It is still another object of the invention to provide a heating stove comprising a casing having a lower chamber in which the liquid fuel tank is disposed and an upper chamber in which the burner manifold constituting a mixing chamber and the vaporizing tube are disposed.

It is still further an object of the invention to provide a stove, as set forth in the preceding paragraph in which one end of the fuel tank and one end of the vaporizing tube project at the exterior of the casing and extend through apertures therein, said tank having supporting and guiding means, and said mixing chamber having an opening alined with the aperture in the casing through which the vaporizing tube extends whereby said tank and vaporizing tube can be slid into place in the casing and the vaporizing tube will properly be connected with the mixing chamber.

It is a further object of the invention to provide a heating stove having a casing in which are normally disposed a liquid fuel tank and vaporizing tube, said parts projecting at the exterior of the casing and having regulating or control means disposed at the exterior of the casing.

These and other objects and advantages of the invention will be fully set forth in the following description made in connection with the accompanying drawings in which like reference characters refer to the same parts throughout the different views and in which:—

Figure 1:
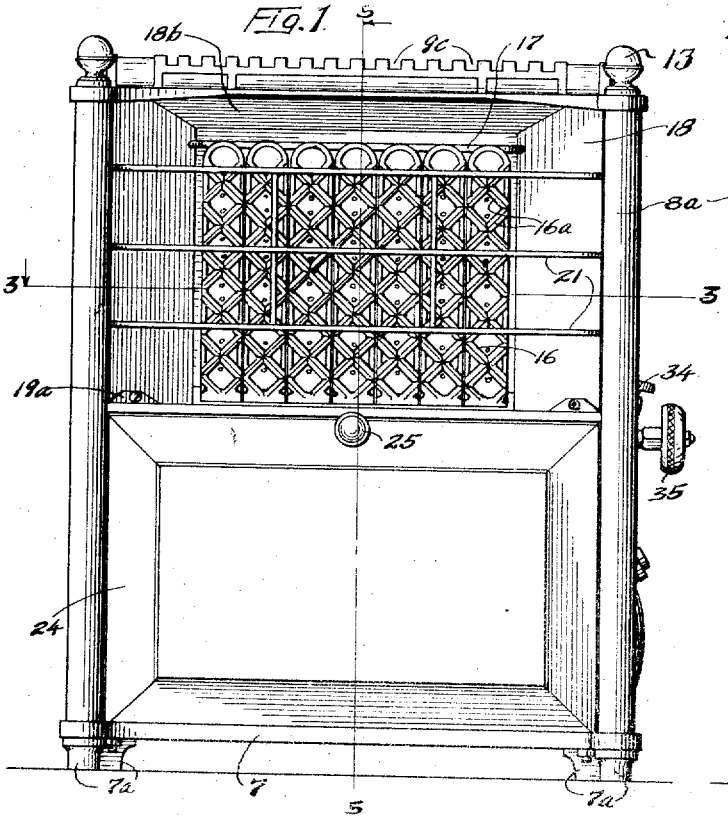
Fig. 1 is a view in front elevation of the stove.
Figure 2:
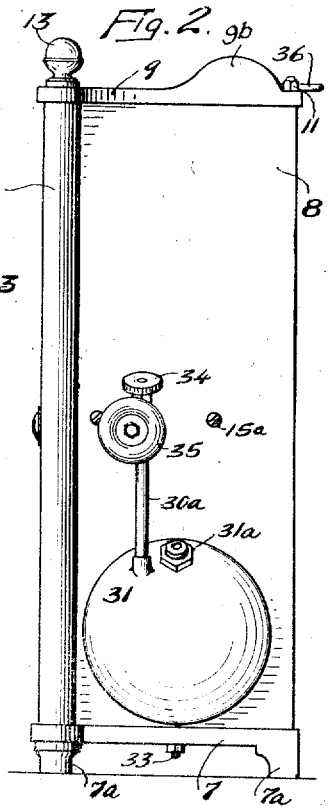
Fig. 2 is a view in end elevation of the stove, as seen from the right of Fig. 1.
Figure 3:
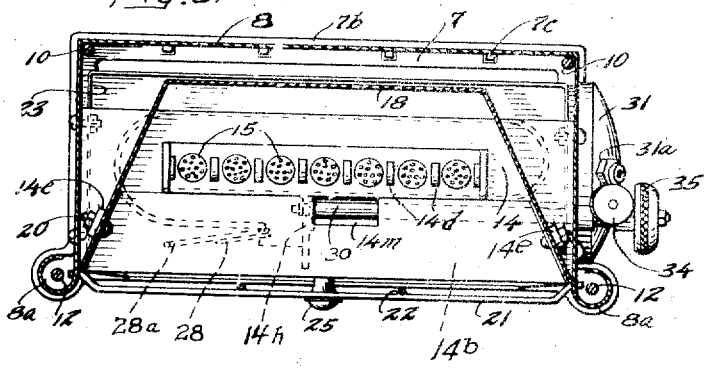
Fig. 3 is a horizontal section taken on the line 3—3 of Fig. 1, as indicated by the arrows.
Figure 7:
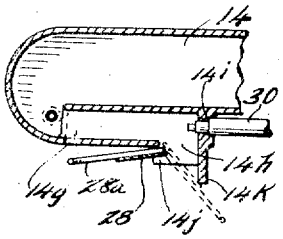
Fig. 7 is a partial horizontal section on the line 7—7 of Fig. 6 as indicated by the arrows.
Figure 5:
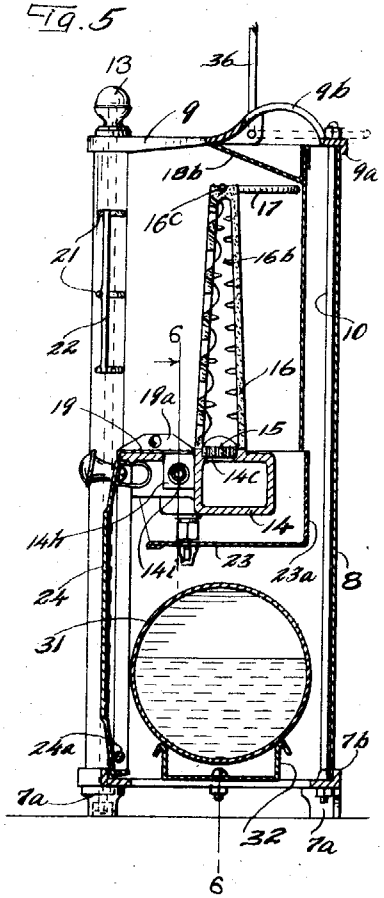
Fig. 5 is a view in vertical section of the stove taken on the line 5—5 of Fig. 1, as indicated by the arrows.
Figure 4:
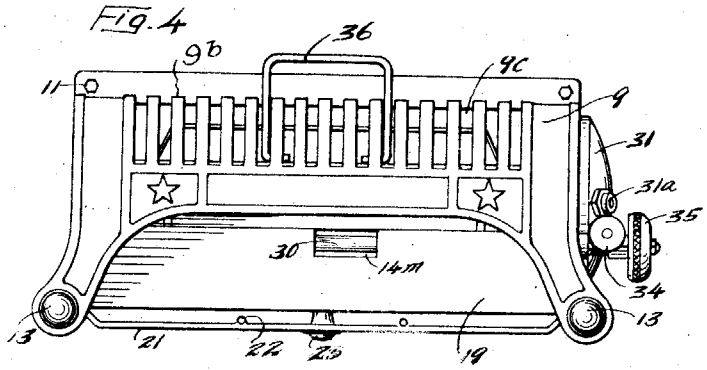
Fig. 4 is a top plan view of the stove.
Figure 6:
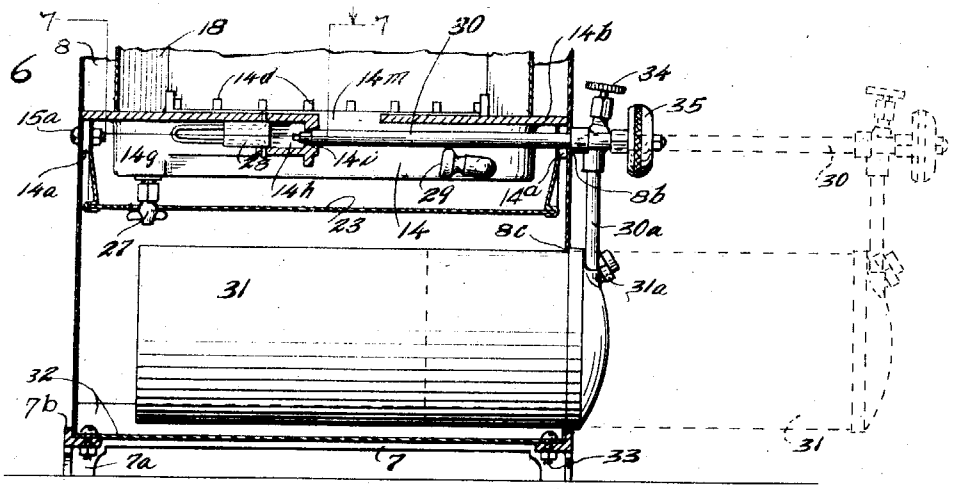
Fig. 6 is a vertical section taken on the line 6—6 of Fig. 5, as indicated by the arrows.

Referring to the drawings, one form of stove, involving the present invention is illustrated comprising a bottom or supporting plate 7. This plate is formed as an openwork rectangular frame having leg portions 7a at the four corners thereof. The frame 7, as shown in Figs. 5 and 6, also has a flange $7^b$ extending thereabout and a casing member 8 preferably formed of sheet metal rests upon the frame 7 and is disposed within said flange $7^b$. The frame 7, along its rear side, also has upstanding spaced lugs $7^c$ and the rear part of the casing 8 is disposed between said lugs and the flange $7^b$. As shown in Fig. 3, the casing 8 is rectangular in shape, having a rear side and end walls thus being open at the front and the end walls, at their forward portions are curved outwardly to form cylindrical portions $8^a$, the flange $7^b$, on the frame 7 and at the top of the cylindrical front legs $7^a$ also being centrally formed and extending about the bottoms of said portions $8^a$. The portions $8^a$ thus give the effect of posts at the sides of the casing. At the top of the stove is the top plate 9 which rests upon the casing 8 and has a flange $9^a$ which extends around the exterior of said casing 8 at its top edge. The top plate 9 is of ornamental shape in appearance, as shown in Figs. 1, 4 and 5, and has a curved semi-cylindrical portion $9^b$ adjacent its rear end, which portion is provided with open slots $9^c$. The top plate 9 and the frame 7 are tied together by bolts 10 extending down at the rear inside corners of casing 8 and having nuts on their threaded end portions, the top nut 11 resting on top of the casing 9, while the nut at the lower end is disposed beneath the front plate 7. The parts 9 and 7 are also tied together at the front by bolts 12 which extend centrally through the cylindrical portions $8^a$. The bolts 12 have nuts threaded on their lower ends disposed at the bottom of plate 7 within the front legs $7^a$ and said bolts at their top ends have ornamental nuts or knobs 13 threaded thereon. A burner casting or manifold 14 is provided which extends across the casing and is generally in the shape of an elongated hollow casting of rectangular form in cross section. Said manifold has a plate $14^b$ at its top side provided with depending lugs or flanges $14^a$ which rest against the inside of casing 8 at its ends and are secured thereto by the headed and nutted bolts $15^a$. Plate $14^b$ has a plurality of openings $14^c$ therethrough illustrated as circular in shape having inwardly extending flanges at their bottoms and perforated burner disks 15 of fire clay or other refractory material are disposed in openings $14^c$ and rest upon said flanges. The plate $14^b$ also has spaced lugs or ribs $14^d$ upstanding therefrom at the ends of and between the openings $14^c$, and upright hollow burner or flame distributing members 16 also formed of refractory material are disposed on the plate $14^b$ over each of the disks 15 and are held in place by the lugs $14^d$. While the members 16 may be of various shapes, in the embodiment of the invention illustrated, they are shown as of general rectangular shape in horizontal cross section, somewhat tapered toward their upper ends, being closed at their rear and sides and having an openwork front formed by diagonal ribs $16^a$ extending thereacross in opposite directions. Said members also preferably have pointed projections $16^b$ projecting forwardly from their rear walls and rearwardly from the ribs $16^a$. The members 16 also each have a groove $16^c$ extending transversely across their top portions and a bail 17 at its front portion disposed in said grooves, the side portions of said bail extending rearwardly, being pivotally mounted in the end walls of a reflector plate 18 substantially at the rear corners of said plate. The bail 17 can thus be swung upwardly about its pivoted ends for the removal or insertion of the members 16. The plate 18 as clearly shown in Fig. 3, has its rear wall spaced a short distance forward of the rear wall of casing 8 and has its side portions projecting forwardly in an outwardly inclined direction substantially to the front of the casing 8 and in contact therewith at the cylindrical portions $8^a$. The bottom of plate 18 contacts with inclined lugs $14^e$ projecting upwardly from the top of manifold 14 or plate $14^b$. The plate 19 is also provided which covers the top of plate $14^b$ and has a depending front flange extending down over the edge of said plate, said plate 19 having short lugs $19^a$ projecting upwardly at the inner sides of plate 18 and these lugs and plate 18 are connected to the lugs $14^e$ by headed and nutted bolts 20. The top deflecting plate $18^b$ is provided inclining forwardly and upwardly from adjacent the top of plate 18 just above the bail 17. Said plate $18^b$ has a vertical portion extending along the front of plate 18 at the top of the latter and bent over the top edge of the latter, thus being supported from plate 18. The end edges of plate $18^b$ are also arranged to rest on the top edges of plate 18. The plates 18 and $18^b$ will be highly polished on their front surfaces. Spaced horizontal wires or rods 21 extend across the front of casing 8 and have their ends secured in the cylindrical portions $8^a$, which wires or rods are connected by spaced vertical wires or rods 22. The members 21 and 22 form a guard for the burner part of the stove. A plate or auxiliary casing 23 is provided having a rear wall $23^a$ spaced from the rear of manifold 14 and substantially in line with the rear portion of plate 18. The bottom of casing 23 extends beneath the manifold 14 and is spaced therefrom, said casing 23 having end walls in contact with the inner sides of lugs $14^a$ and connected thereto by the bolts $15^a$. Casing 8 is provided with a front door 24 which extends from the plate 19 to the bottom front plate 7 and has a hinged pintle $24^a$, the ends of which are pivoted in the burner portions $8^a$ of casing 8. Said door 24 is provided with a knob handle 25 and has a spring latch 26 adapted to spring over and be held in place by a depending latch lug $14^f$ on plate $14^b$. It will be noted that the front edge of the bottom of casing 23 is spaced from the door 24. The manifold 14 has a forwardly projecting portion $14^g$ at one end, namely, the left hand end, as shown in Fig. 6, and a drain cock 27 is provided extending from said portion $14^g$ through the bottom of casing 23. The portion $14^g$ also has a forwardly projecting flange $14^k$ which has an opening $14^l$ therethrough, which opening is cylindrical at its inner end but conical or flaring at its outer end. The said extension $14^g$ has an opening at $14^h$ at its front to form an inlet opening for air into the manifold 14, which manifold also constitutes a mixing chamber and a swinging shutter or valve member 28 is pivoted at one end of said opening and has a handle $28^a$ by which it can be swung to close said opening, said opening having a bottom flange $14^j$ projecting therefrom with which, and the flange $14^k$, said member 28 co-operates. An auxiliary burner 29 is provided which is connected to the manifold 14 and this burner projects upwardly in an inclined direction so that the flame thereof will play upon a vaporizing tube 30 which projects into the opening $14^l$ at one end and extends through an opening $8^b$ in the casing 8 at its other end. The plate $19^b$ has an opening $14^m$ therethrough toward which the burner 29 is projected. A liquid fuel tank 31 is provided which is supported and guided upon a member 32. While this member may be of various shapes and be variously formed, in the embodiment of the invention illustrated, it is shown as of channel shape made from a rectangular plate having its side edges bent upwardly at right angles and then bent outwardly a short distance. The member 32 is bolted at its ends by the headed and nutted bolts 33 to the frame member 7 and its ends abut against the ends of casing 8 at the bottom of the latter and tend to hold the latter casing in position. The member 32 thus forms a trough or supporting and guiding means for tank 31 and said tank projects at one end through an opening $8^c$ in casing 8. The tank is rigidly connected with the vaporizing tube 30 by a right angle extension $30^a$ of said tube. The tube 30 is provided with a shut-off valve 34 and said tube 30 has an opening at its inner end with which a needle valve (not shown) co-operates, which valve is regulated by the valve wheel 35, the valve 34 and the valve 35 being disposed outside of the casing 8. The tank 31 is provided with a filling member $31^a$ which is also provided with a spring valve so that air can be pumped into said tank. The stove is provided with a suitable handle which is illustrated as a rectangular bail 36 having its ends secured in lugs on the top plate 9, as shown in Figs. 4 and 5.

In operation, the tank 31 will be withdrawn from the casing together with the connected vaporizing tube 30. These parts are merely pulled outwardly from the casing, tank 31 sliding on the member 32, as illustrated in Fig. 6. The tank can be taken to any desired place to be filled and the same will then be charged with air pumped through the member $31^a$ so that the liquid in the tank is under pressure, the valves 34 and 35 at all times being closed. The tank 31 and tube 30 will again be placed in the casing. Owing to the fact that the opening $8^b$ is alined with the opening $14^l$ and the tank 31 is guided on the member 32, the end of the vaporizing tube 30 need only be guided into the opening $8^b$ after tank 31 is partly inserted through opening $8^c$ and the tank and tube then merely pushed inwardly. The inner end of tube 30 will then enter and seat properly in the opening $14^l$. The tank and vaporizing tube being in place, the door is opened and the stove initially started by applying a torch beneath the vaporizing tube 30, the valve 34 being previously opened as well as valve 35. It is desirable to have a rich mixture during this preliminary lighting of the stove and at this time the member 28 will be swung to substantially close the opening $14^h$. A combustible mixture is soon formed in the mixing chamber of the manifold 14 and rises through the perforations in the disks 15 and into the members 16. This mixture will be ignited at the members 16. As soon as the combustible mixture is thus formed and the burners ignited said mixture will issue through the auxiliary burner 29, and be drawn upward through opening $14^m$. The flame will ignite this mixture and pass back to the burner 29 so that said burner 29 is also ignited. The flame from this burner plays on the tube 30 and continues the vaporizing so that the vaporized fuel is continually supplied to the mixing chamber through the opening $14^l$. The stove now being started the member 28 can be swung to its open position and air is supplied to the mixing chamber and manifold 14 through the opening $14^h$. The size and intensity of the flame used can be regulated by manipulation of the valve 35. When the stove is started the door 24 will be closed. The air passing into the mixing chamber enters the bottom of the stove through the plate 7 at each side of member 32. There will also be an upward current of air induced owing to the heat above the plate $14^b$, which current will pass through the passage between the plate 18 and the rear of the casing 8 and pass out through the openings $9^c$. All of this air thus passing upwardly through the stove, as stated, enters at the bottom at each side of member 32 and thus passes around the fuel tank 31 and this tank is thus kept perfectly cool by the entrance of this cool air. A combustible mixture is continuously formed in the member 14 and continuously supplied to the burners 16. The heat from the burner 16 will be radiated at the front of the stove and the reflecting plates 18 and 18[a] will reflect the heat forwardly. A very efficient heating effect is thus obtained. It will, of course, be understood that the tank 31 can be removed for a new supply of fuel whenever desired.

From the above description it is seen that applicant has provided a very simple and efficient portable heating stove adapted to use liquid vaporizing fuel, such as gasoline. The stove is of convenient size, comprises comparatively few parts and has a very pleasing appearance. The heating power of the stove is superior to a stove of similar size using the ordinary artificial gas and this stove is much more economical of fuel than a gas stove. Furthermore, the stove can be transported to wherever desired and placed in whatever position desired in any room and is not limited by any connection to a gas or other fixture, as is the case with an electric or gas stove. The stove has a high degree of utility in any dwelling where heat is desired and it is particularly useful where there is no supply of other heating material such as gas or electricity. The stove is being commercially made and has been amply demonstrated in actual use and found to be very successful and efficient.

It will, of course, be understood that various changes may be made in the form, details, arrangement and proportions of the parts without departing from the scope of applicant's invention, which, generally stated, consists in a device adapted to carry out the objects above set forth, in the novel parts, and combinations of parts disclosed and defined in the appended claims.

What is claimed is:—

1. A heating stove having in combination, a rigid frame comprising an upright casing, said casing being open at the bottom, a detachable fuel tank in said casing, a support for said tank on which it is longitudinally slidable, one end wall of said casing having an aperture therethrough, through which said tank passes when being detached from said stove, a vaporizing tube connected to said tank and projecting through said end wall, a manifold supported in said casing above said tank comprising a mixing chamber, said vaporizing tube communicating with said mixing chamber, burners carried by said manifold, the upper portion of said casing in front of said burners being open.

2. A heating stove having in combination, a rigid frame comprising an upright casing, a detachable fuel tank in said casing, a support for said tank on which it is longitudinally slidable, one end wall of said casing having an aperture therethrough through which said tank is movable, a vaporizing tube connected to said tank and projecting within said end wall, a manifold supported in said casing above said tank comprising a mixing chamber with which said vaporizing tube communicates, burners carried by said manifold, a horizontal partition in said casing and continued vertically in the rear of the aforesaid manifold and spaced from the rear wall of said casing, said casing in front of said burners being open.

3. A heating stove having in combination, a rigid frame comprising an upright casing, a detachable fuel tank in said casing, a support for said tank on which it is longitudinally slidable, one end wall of said casing having an aperture through which said tank is movable, a vaporizing tube extending through said wall, said vaporizing tube having a connection with said tank outside of said casing, a regulating valve for said vaporizing tube having an operating handle disposed without said casing and a manifold supported in said casing above said tank.

4. The structure as set forth in claim 1, said tank and vaporizing tube having means engaging the exterior of said tank to form a stop and limit the movement thereof into the casing.

5. A heating stove having in combination, a rigid frame comprising an upright casing, a detachable fuel tank in said casing, a support for said tank, a vaporizing tube connected to said tank, a manifold supported in said casing above said tank comprising a mixing chamber, said vaporizing tube communicating with said mixing chamber and adapted to be moved into connection therewith when said tank is moved into said casing to place said stove in operative condition, and burners carried by said manifold, the upper portion of said casing in front of said burners being open.

6. A heating stove adapted to use liquid vaporizing fuel, having in combination, a rigid permanently assembled frame comprising a casing having a rear wall, end walls and front wall extending throughout the lower portion of said casing thus forming a chamber, a fuel tank disposed in said chamber, a burner-carrying manifold disposed within said chamber and operatively connected thereto, a partition in said casing above said fuel tank, and a plate extending upwardly from said partition and spaced from said rear wall of said casing, said chamber having openings at its bottom whereby draft passages are formed around the tank and between said rear wall and last mentioned plate.

7. A heating stove having in combination, a frame comprising an upright casing, the lower part of said casing forming a chamber, a detachable fuel tank located in said chamber, a support for said tank, a vaporizing tube attached to said tank, a manifold in said casing above said tank comprising a mixing chamber with which said vaporizing tube communicates, and a regulating valve for said vaporizing tube having an operating handle without said casing.

In testimony whereof I affix my signature.

HANS C. HANSON.